(12) United States Patent
Fong

(10) Patent No.: US 6,505,845 B1
(45) Date of Patent: Jan. 14, 2003

(54) JOGGING SCOOTER

(76) Inventor: Chin-Long Fong, 3/F., No. 2, Alley 2, Lane 211, Yungfu St., Sanchung City, Taipei County (TW)

( * ) Notice: Subject to any disclaimer, the term of this patent is extended or adjusted under 35 U.S.C. 154(b) by 0 days.

(21) Appl. No.: 10/123,309

(22) Filed: Apr. 17, 2002

(51) Int. Cl.[7] ............................................. B62M 1/00
(52) U.S. Cl. ..................... 280/228; 280/220; 280/287; 280/87.041; 482/70
(58) Field of Search ................................. 280/228, 222, 280/220, 87.041, 87.05, 221, 217, 241, 270, 287, 210; 440/29; 482/54, 66, 70

(56) References Cited

U.S. PATENT DOCUMENTS

| | | | | | |
|---|---|---|---|---|---|
| 1,350,546 | A | * | 8/1920 | Culver | 280/228 |
| 1,353,011 | A | * | 9/1920 | Young | 280/228 |
| 1,696,927 | A | * | 1/1929 | Snyder | 280/222 |
| 3,809,003 | A | * | 5/1974 | Foldvari | 440/29 |
| 4,009,769 | A | * | 3/1977 | Nagatomo | 188/196 BA |
| 4,334,695 | A | * | 6/1982 | Ashby | 280/228 |
| 4,828,284 | A | * | 5/1989 | Sandgren | 280/221 |
| 5,388,659 | A | * | 2/1995 | Pepe | 180/208 |
| 5,894,898 | A | * | 4/1999 | Catto | 180/181 |
| 2002/0096846 | A1 | * | 7/2002 | Chen | 280/87.041 |
| 2002/0105160 | A1 | * | 8/2002 | Yen | 280/252 |
| 2002/0108798 | A1 | * | 8/2002 | Huntsberger et al. | 180/220 |

FOREIGN PATENT DOCUMENTS

| | | | | |
|---|---|---|---|---|
| DE | 3831220 A1 | * | 3/1990 | B62M/1/04 |
| DE | 20114331 U1 | * | 10/2001 | B62K/5/00 |
| FR | 2806921 A3 | * | 10/2001 | A63B/22/02 |
| GB | 2367541 A | * | 4/2002 | B62K/5/08 |
| RU | 2004276 C1 | * | 12/1993 | A63B/22/02 |

* cited by examiner

*Primary Examiner*—Anne Marie Boehler
*Assistant Examiner*—Daniel Yeagley
(74) *Attorney, Agent, or Firm*—Rosenberg, Klein & Lee

(57) ABSTRACT

A jogging scooter is constructed to include a base holding a set of tracker rollers, two tracks mounted on the tracker rollers and arranged in parallel, a front wheel rack provided at a front side of the base, two front wheel holders respectively pivoted to the front wheel rack and linked by a link and supporting a respective front wheel, a steering column mounted on the front wheel rack and coupled to the link for steering control, a rear wheel axle mounted in a rear side of the base and supporting a pair of rear wheels, and two gears meshed together and respectively mounted on the rear wheel axle and the rear tracker roller for transmission of rotary force.

7 Claims, 6 Drawing Sheets

JOGGING SCOOTER

BACKGROUND OF THE INVENTION

1. Field of the Invention

The present invention relates to scooters and, more specifically, to a jogging scooter, which is provided with two parallel tracks for jogging.

2. Description of the Related Art

A conventional kick scooter is a wheeled vehicle propelled by one foot. When riding a kick scooter, the user needs to rest one foot on the kick scooter and kick the other foot against the ground. According to this kick scooter riding method, the legs receive different exercising amount. Further, this structure of kick scooter is particularly designed for young people, not suitable for older persons.

SUMMARY OF THE INVENTION

The present invention has been accomplished under the circumstances in view. It is one object of the present invention to provide a jogging scooter, which can be used as a kick scooter as well as a jogging exerciser. It is another object of the present invention to provide a jogging scooter, which is suitable for people of different ages. It is still another object of the present invention to provide a jogging scooter, which keeps the legs exercised in equal exercising amount. To achieve these and other objects and according to one aspect of the present invention, the jogging scooter comprises a base holding a set of tracker rollers, two tracks mounted on the tracker rollers and arranged in parallel, a front wheel rack provided at a front side of the base, two front wheel holders respectively pivoted to the front wheel rack and linked by a link and supporting a respective front wheel, a steering column mounted on the front wheel rack and coupled to the link for steering control, a rear wheel axle mounted in a rear side of the base and supporting a pair of rear wheels, and two gears meshed together and respectively mounted on the rear wheel axle and the rear tracker roller for transmission of rotary force. According to another aspect of the present invention, a brake is provided at the front side of the base and controlled by a brake lever to stop the tracker rollers from rotation. According to still another aspect of the present invention, two collapsible footplates are provided at two sides of the base.

DETAILED DESCRIPTION OF THE PREFERRED EMBODIMENT

Figure 1:
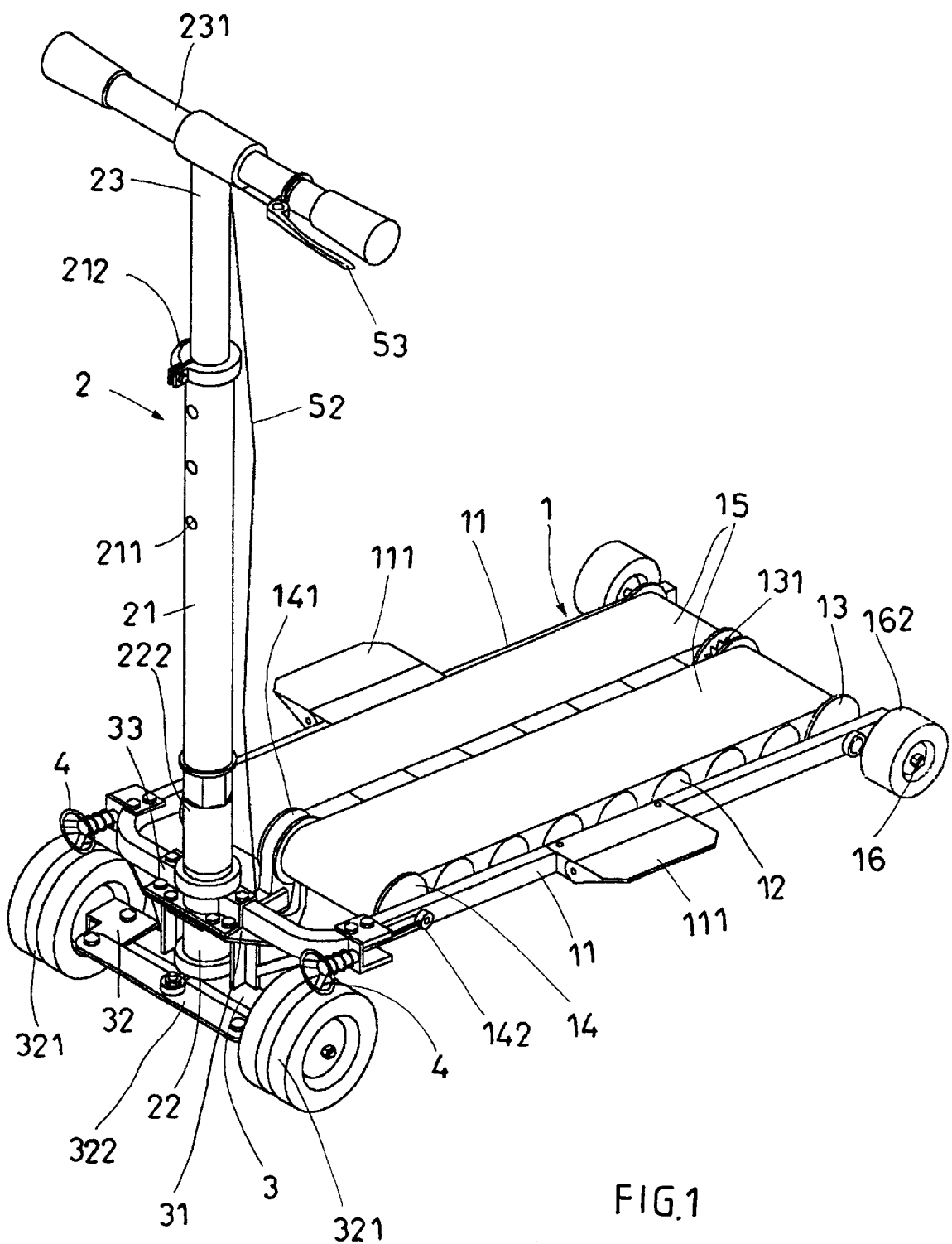
FIG. 1 is a perspective view of a jogging scooter according to the present invention.
Figure 2:
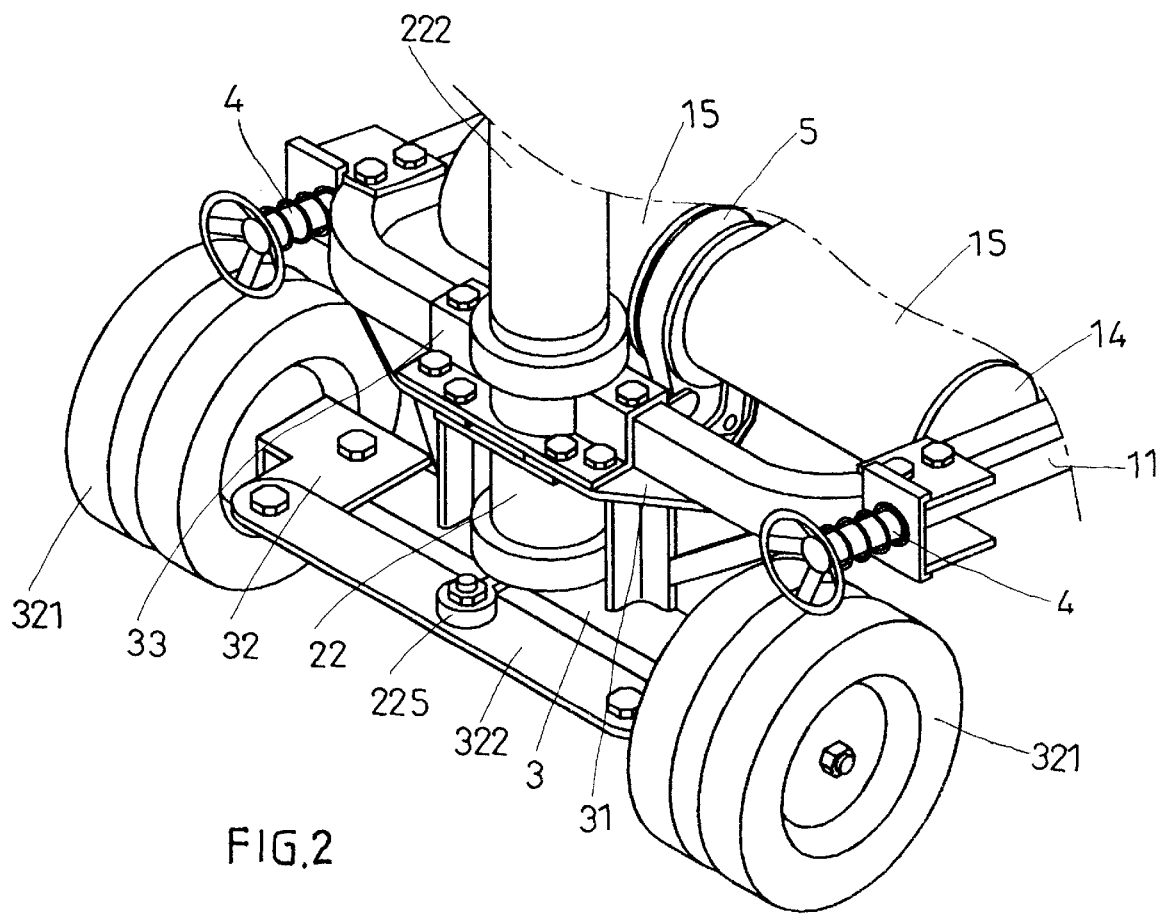
FIG. 2 is an enlarged view of the front part of the jogging scooter shown in FIG. 1.
Figure 4:
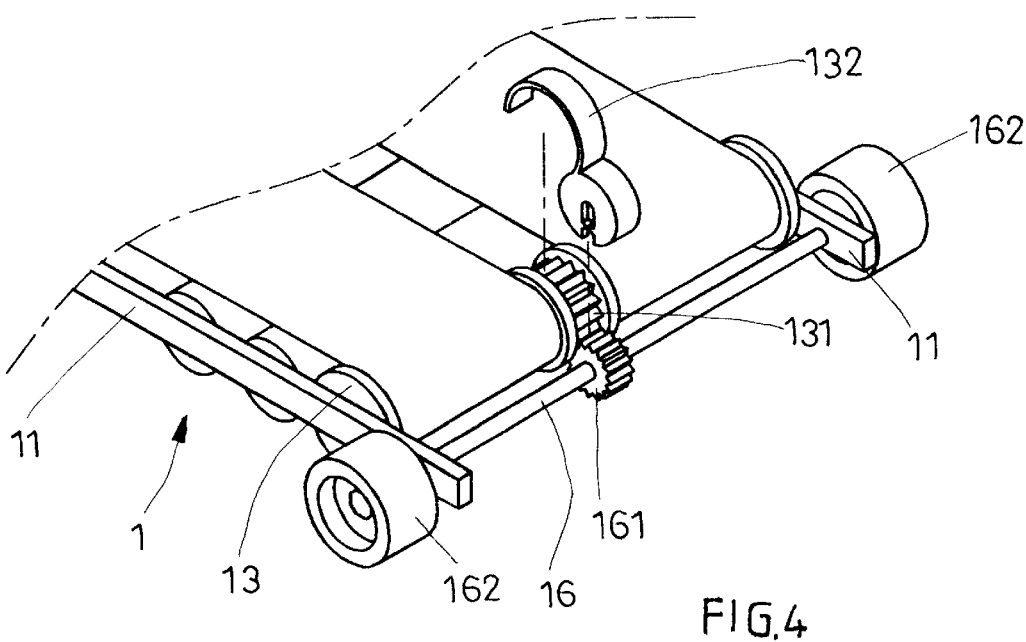
FIG. 4 is an oblique view of the rear part of the jogging scooter shown in FIG. 1.

Referring to FIGS. from 1 through 5, a jogging scooter comprises a base 1. The base 1 comprises two side frame bars 11, two collapsible footplates 111 respectively mounted on the side frame bars 11 on the middle at an outer side, a set of tracker rollers 12 arranged in parallel between the side frame bars 11, and two tracks 15 mounted on the sets of tracker rollers 12 and arranged in parallel. The set of tracker rollers 12 includes a front tracker roller 14 and a rear tracker roller 13. A driving gear wheel 131 is fixedly on the rear tracker roller 13 of the set of tracker rollers 12. A rear wheel axle 16 is transversely mounted in the side frame bars 11. Two rear wheels 162 are respectively pivoted to the ends of the rear wheel axle 16. A transmission gear 161 is fixedly mounted on the rear wheel axle 16 and meshed with the driving gear wheel 131. A gear wheel guard 132 is installed in the base 1 around the driving gear wheel 131 and the transmission gear 161 to protect the driving gear wheel 131 and the transmission gear 161 against mud and external bodies. A steering column 2 and a front wheel rack 3 are provided at the front side of the base 1. The front wheel rack 3 comprises a horizontal top mounting plate 31, two front wheel holders 32 pivoted thereto at two sides, two front wheels 321 respectively mounted on the front wheel holders 32, and a link 322 coupled between the front wheel holders 32. The horizontal top mounting plate 31 has an opening 311. The steering column 2 is comprised of a bottom column holder 22, a coupling member 223 supported in bearing means B (not shown) in the bottom column holder 22, a sleeve 21, and a head tube 23. The head tube 23 is provided with a handlebar 231. The bottom column holder 22 is mounted in the opening 311 of the horizontal top mounting plate 31 of the front wheel rack 3, having a mounting flange 221 disposed around the periphery and fixedly fastened to the horizontal top mounting plate 31 by screws. A connecting member 33 is fixedly fastened to the top horizontal mounting plate 31 of the front wheel rack 3. The connecting member 33 comprises an opening 331 on the middle, and two coupling holes 332 aligned at two sides of the opening 331 and respectively fastened to the curved front ends of the side frame bars 11 by screws. The bottom column holder 22 has a bottom side provided with a driving arm 225 connected to the link 322 for controlling the steering direction of the front wheel holders 32 and the front wheels 321. Two hand screws 4 are bilaterally provided at the front side of the base 1 and coupled to the ends of the wheel axle 142 of the front tracker roller 14 for rotation by hand to control the pitch between the front tracker roller 14 and the rear tracker roller 13, and to further adjust the tension of the tracks 15.

Figure 3:
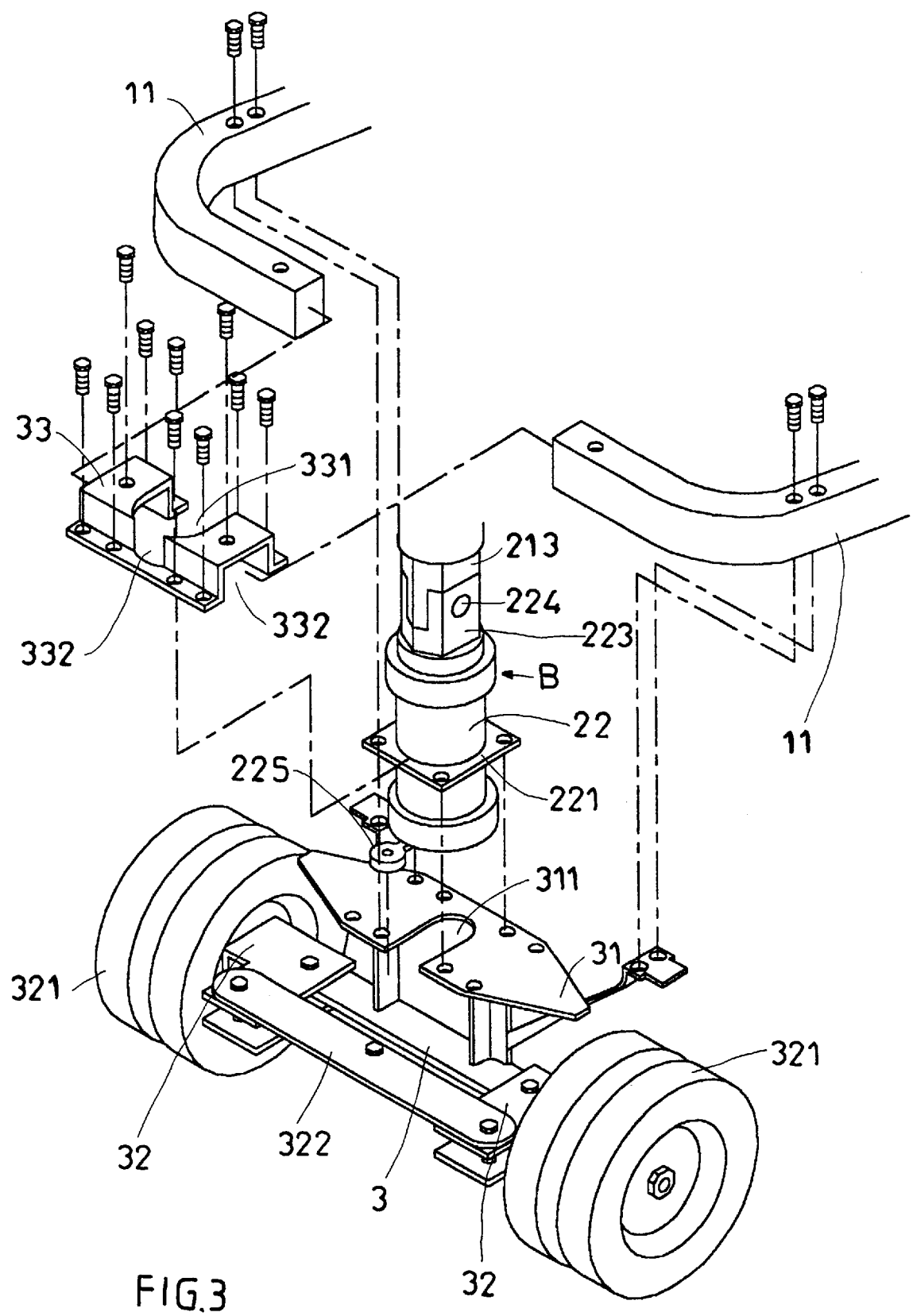
FIG. 3 is an exploded view of a part of FIG. 2.

Referring to FIGS. from 6 through 8 and FIGS. 1 and 3 again, the sleeve 21 has a bottom coupling rod 213 pivoted to the coupling member 223 in the bottom column holder 22 by a pivot 224. The coupling rod 213 and the top coupling member 223 have a polygonal cross section. A locking barrel 222 is sleeved onto the bottom coupling rod 213 of the sleeve 21 before connection of the sleeve 21 to the bottom column holder 22. The locking barrel 222 has an axially extended polygonal through hole 2221 fitting the polygonal cross section of the top coupling member 223 and the coupling rod 213. After connection of the sleeve 21 to the bottom column holder 22, the locking barrel 222 can be moved vertically along the coupling rod 213 between the locking position where the locking barrel 222 has a part sleeved onto the top coupling member 223 to hold the sleeve 21 and the bottom column holder 22 positively in the vertically aligned position (the operative position), and the unlocking position where the locking barrel 222 is disengaged from the coupling member 223, for enabling the sleeve 21 to be turned downwards from the vertical position (the operative position) to the horizontal position (the collapsed position). The sleeve 21 further comprises a longitudinal series of retaining holes 211. The head tube 21 is longitudinally slidably inserted into the sleeve 21, having a spring plate 233 fixedly mounted on the inside and a retainer rod 232 fixedly connected to the free end of the spring plate 233 and partially extended out of a radial hole (not shown) thereof for engaging into one of the retaining holes 211 of the sleeve 21. Further, a lock ring 212 is provided at the top side of the sleeve 21, and adapted to lock the head tube 23 at the desired elevation. Further, the front wheels 321 are greater than the rear wheels 162 so that the base 1 is maintained in an oblique position when put the jogging scooter on the ground.

Figure 5:
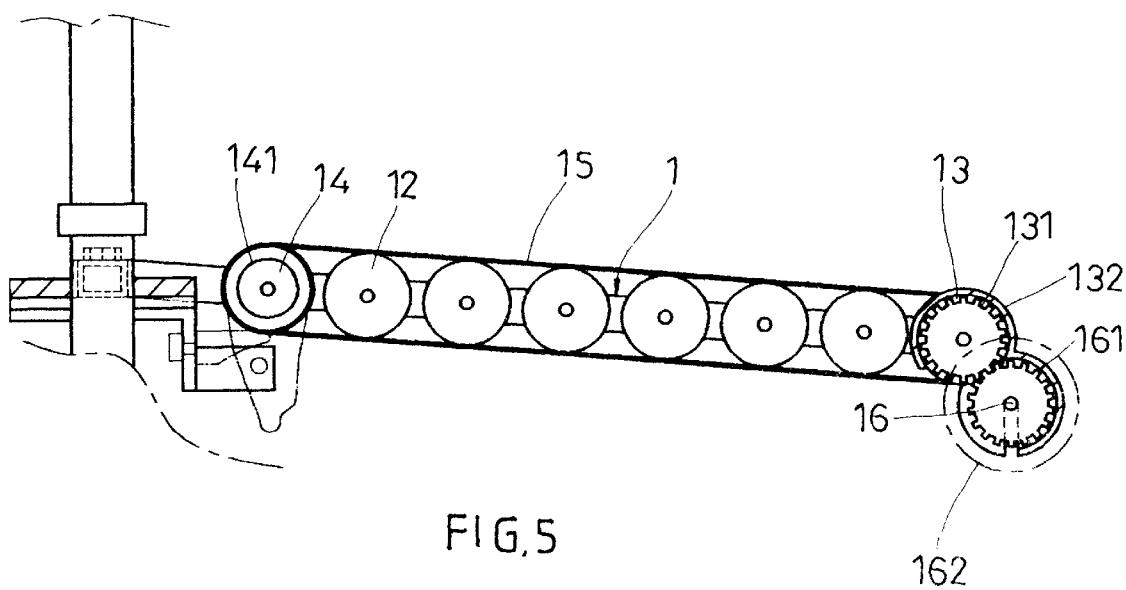
FIG. 5 is a side plain view of a part of the jogging scooter according to the present invention.
Figure 8:
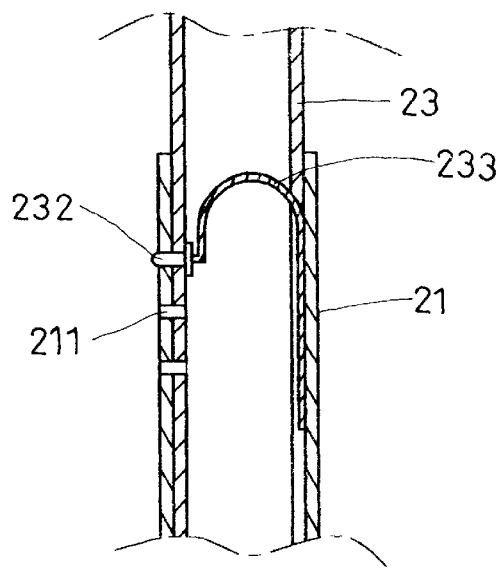
FIG. 8 is a sectional view of a part of the steering column according to the present invention.
Figure 7:
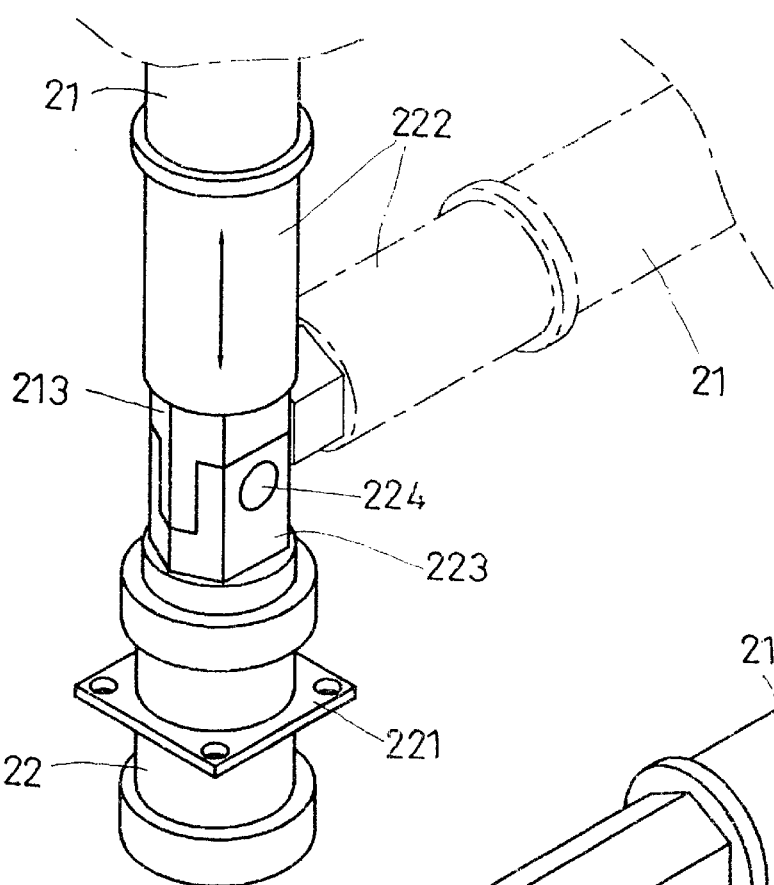
FIG. 7 is schematic drawing showing the sleeve turned relative to the bottom column holder between the operative position and the collapsed position.
Figure 6:
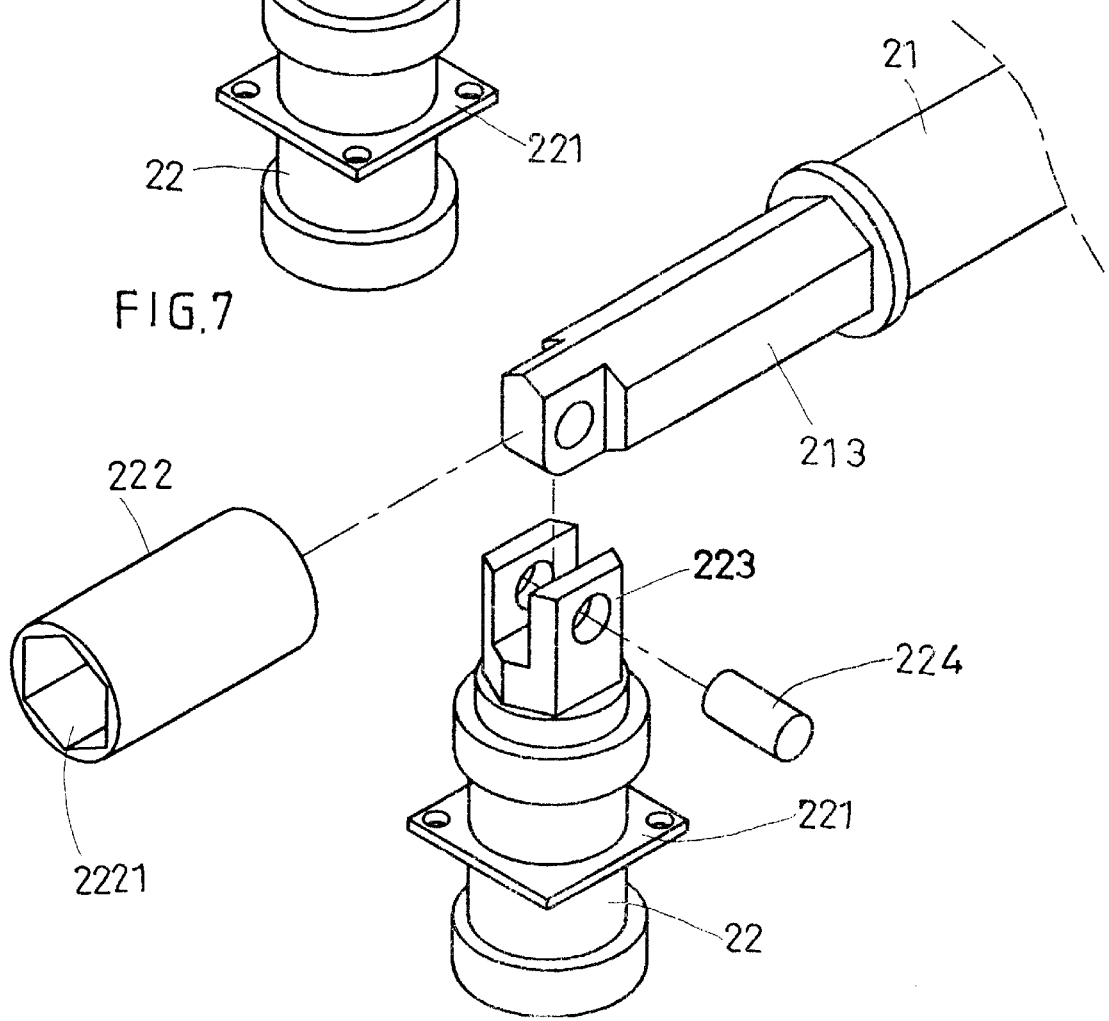
FIG. 6 is an exploded view of a part of the present invention, showing the structure of the steering column.
Figure 9:
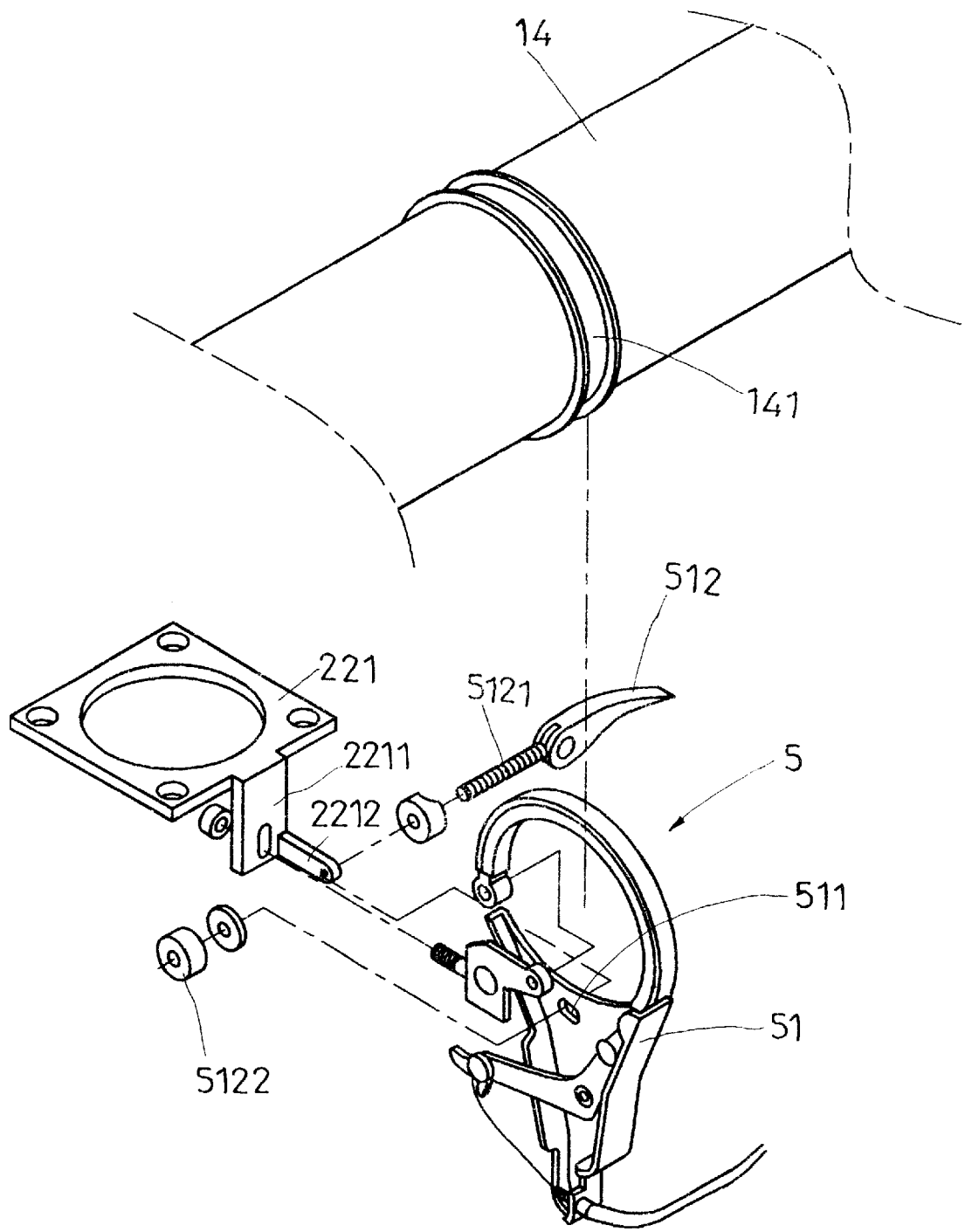
FIG. 9 is an exploded view of a part of the present invention, showing the mounting arrangement of the brake.

Referring to FIG. 9 and FIG. 5 again, a brake 5 is provided near the front side of the base 1 for stopping the jogging scooter. The brake 5 comprises a brake shoe assembly 51 fixedly fastened to a lug 2211 of the mounting flange 221 of the bottom column holder 22, the brake shoe assembly 51 has an oblong hole 511, a screw rod 5121 inserted through the oblong hole 511 of the brake shoe assembly 51 and fixedly fastened to a rod 2212 of the lug 2211 by a lock nut 5122, and an actuating member 512 pivoted to the screw rod 5121 and connected to the brake lever 53 at the handlebar 231 of the steering column 2 through a brake cable 52. When pulling the brake lever 53, the actuating member 512 is driven by the brake cable 52 to force the brake shoe assembly 51 against a friction member 141, which is fixedly mounted on the middle of the front tracker roller 14, producing a friction resistance to stop the front tracker roller 14 from rotation, and therefore the jogging scooter is stopped.

A prototype of jogging scooter has been constructed with the features of FIGS. 1~9. The jogging scooter functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A jogging scooter comprising:

a base frame, said base frame comprising two side frame bars;

a plurality of tracker rollers transversely pivotally connected between said side frame bars and arranged in parallel, said tracker rollers including a front tracker roller, a rear tracker roller, and a plurality of intermediate tracker rollers spaced between said front tracker roller and said rear tracker roller, said front tracker roller provided with a friction member on the middle, said rear tracker roller provided with a driving gear wheel;

a brake unit adapted for acting with the friction member of said front tracker roller to stop the jogging scooter from moving;

two tracks respectively mounted on said tracker rollers and arranged in parallel;

a rear wheel unit, said rear wheel unit comprising a rear wheel axle transversely mounted in said side frame bars, two rear wheels respectively pivoted to two distal ends of said rear wheel axle, and a transmission gear fixedly mounted on said rear wheel axle and meshed with said driving gear wheel;

a front wheel unit, said front wheel unit comprising a front wheel rack, said front wheel rack comprising a horizontal top mounting plate, two front wheel holders respectively pivoted to said front wheel rack at two sides, two front wheels respectively mounted on said front wheel holders, and a link coupled between said front wheel holders; and a steering column for controlling steering direction of the jogging scooter, said steering column comprising a bottom column holder, said bottom column holder comprising a mounting flange fixedly fastened to the horizontal top mounting plate of said front wheel rack, a coupling member supported in bearing means in said bottom column holder, a sleeve connected to said coupling member, a driving arm connected between said coupling member and said link, a head tube axially slidably inserted into said sleeve and provided with a handlebar disposed outside said sleeve, and a lock ring provided at a top side of said sleeve and adapted to lock said head tube.

2. The jogging scooter as claimed in claim 1 further comprising a connecting member fixedly mounted on the horizontal top mounting plate of said front wheel rack, said connecting member having an opening adapted for receiving the bottom column holder of said steering column, and two coupling holes disposed at two sides of the opening and respectively connected to a curved front end of each of said side frame bars.

3. The jogging scooter as claimed in claim 1, wherein said sleeve is pivoted to said coupling member and provided with a locking barrel, said locking barrel being slidably sleeved onto said sleeve and moved between a first position where said locking barrel locks said sleeve in vertical alignment with said coupling member and a second position where said sleeve is allowed to be turned relative to said coupling member.

4. The jogging scooter as claimed in claim 1, further comprising two hand screws bilaterally provided at a front side of said base and respectively coupled to said front tracker rollers for rotation by hand to control the pitch between said front tracker roller and said rear tracker roller, and to further adjust the tension of said tracks.

5. The jogging scooter as claimed in claim 1, wherein said brake unit comprises a brake shoe assembly fixedly fastened to a lug at said mounting flange of said bottom column holder, said brake shoe assembly having an oblong hole, a screw rod inserted through the oblong hole of said brake shoe assembly and fixedly fastened to a fixed rod at said lug by a lock nut, and an actuating member pivoted to said screw rod and connected to a brake lever at said steering column through a brake cable for driving said brake shoe assembly against the friction member at said front tracker roller to stop the jogging scooter when pulling the brake lever.

6. The jogging scooter as claimed in claim 1, further comprising two collapsible footplates respectively mounted on said side frame bars.

7. The jogging scooter as claimed in claim 1, further comprising a gear wheel guard installed in said base around said driving gear wheel and said transmission gear.

* * * * *